(12) United States Patent
Bergum et al.

(10) Patent No.: US 9,193,231 B2
(45) Date of Patent: Nov. 24, 2015

(54) DRAWBAR HITCH MOUNT ASSEMBLIES

(71) Applicant: Forage Innovations B.V., Maassluis (NL)

(72) Inventors: Eric Bergum, Pella, IA (US); Philip Egging, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 52 days.

(21) Appl. No.: 14/010,608

(22) Filed: Aug. 27, 2013

(65) Prior Publication Data

US 2015/0061261 A1 Mar. 5, 2015

(51) Int. Cl.
 *B60D 1/167* (2006.01)
 *B60D 1/02* (2006.01)
 *B60D 1/00* (2006.01)

(52) U.S. Cl.
 CPC ...... *B60D 1/167* (2013.01); *B60D 1/02* (2013.01); *B60D 2001/008* (2013.01)

(58) Field of Classification Search
 CPC ..... B60D 1/167; B60D 1/02; B60D 2001/008
 USPC ............... 280/494, 493, 495, 456.1; 172/450, 172/248, 449, 445; 180/53.3
 See application file for complete search history.

(56) References Cited

U.S. PATENT DOCUMENTS

| | | | |
|---|---|---|---|
| 1,501,652 A | 7/1924 | Ferguson | |
| 2,189,170 A | 2/1940 | Gaussoin | |
| 2,215,903 A | 9/1940 | Edwards | |
| 2,230,242 A | 2/1941 | Goodrich | |
| 2,591,916 A | 4/1952 | Caughman | |
| 2,671,673 A | 3/1954 | Benson | |
| 2,832,607 A | 4/1958 | Kramer | |
| 3,420,549 A | 1/1969 | Robinson | |
| 3,557,892 A * | 1/1971 | Burrough | 180/14.1 |
| 3,744,819 A | 7/1973 | Cook et al. | |
| 4,073,507 A | 2/1978 | Dingess | |
| 4,192,524 A | 3/1980 | Twiestmeyer | |
| 4,225,149 A | 9/1980 | Koopman | |
| 4,366,877 A | 1/1983 | Vissers et al. | |
| 4,723,787 A | 2/1988 | Hadley et al. | |
| 4,725,068 A * | 2/1988 | Taylor et al. | 280/416.2 |
| 4,871,184 A | 10/1989 | Johnson | |
| 5,048,854 A | 9/1991 | Clark | |
| 5,355,971 A | 10/1994 | Austin et al. | |
| 5,769,559 A | 6/1998 | Olson | |
| 5,921,699 A | 7/1999 | Olson | |
| 6,412,570 B1 | 7/2002 | Pruitt et al. | |
| 6,494,477 B1 | 12/2002 | Parker | |
| 6,499,512 B2 | 12/2002 | Debaes | |
| 6,758,486 B1 | 7/2004 | Kollath | |
| 6,776,432 B2 | 8/2004 | Harkcom et al. | |
| 6,877,758 B2 * | 4/2005 | Colistro | 280/494 |
| 7,004,488 B2 | 2/2006 | Reiter et al. | |

(Continued)

OTHER PUBLICATIONS

ASABE, Agricultural vehicles—Mechanical connections between towed and towing vehicles—Part 3: Tractor drawbar, dated Jun. 2009, pp. 7.

*Primary Examiner* — Anne Marie Boehler
*Assistant Examiner* — Marlon Arce
(74) *Attorney, Agent, or Firm* — Armstrong Teasdale LLP

(57) ABSTRACT

Drawbar hitch mount assemblies for towing an implement such as a mower conditioner are disclosed. The assemblies include a hitch receiver capable of pivoting relative to the implement and/or towing vehicle.

25 Claims, 9 Drawing Sheets

(56) References Cited

U.S. PATENT DOCUMENTS

| | | |
|---|---|---|
| 7,308,947 B2 | 12/2007 | Barnett |
| 7,338,062 B1 * | 3/2008 | Violette et al. ............ 280/478.1 |
| 7,637,525 B2 | 12/2009 | Rightmire |
| 7,669,878 B1 | 3/2010 | Williams, Jr. |
| 2002/0047246 A1 * | 4/2002 | Harkcom et al. ............ 280/494 |
| 2002/0079013 A1 | 6/2002 | Debaes |
| 2012/0151892 A1 * | 6/2012 | Clark et al. .................. 56/15.7 |

* cited by examiner

DRAWBAR HITCH MOUNT ASSEMBLIES

FIELD OF THE DISCLOSURE

The field of the disclosure relates to drawbar hitch mount assemblies for towing an implement and, in particular, assemblies that are integral to the implement and have a drawbar receiver that is configured for mounting in a relatively fixed relationship with a drawbar while allowing the implement to swivel relative to the towing vehicle.

BACKGROUND

Many implements, such as mower conditioners, are operated by use of a towing vehicle (e.g., tractor) that propels and directs the implement through the field. Rotational power is provided to the implement through a driveline that attaches to the power-take-off ("PTO") shaft of the towing vehicle. Such implements may be pulled by use of a two-point linkage or a drawbar connected to the towing vehicle. Attachment by use of the drawbar may be easier and faster for the operator relative to use of two-point linkages. When the drawbar is used, a drawbar receiver (synonymously herein "hitch receiver" or "drawbar hitch receiver") of the implement mates with the drawbar and a hitch pin is used to connect the drawbar to the drawbar receiver. The drawbar receiver is connected to the tongue of the implement.

The implement typically includes a driveline that transfers power from the PTO drive assembly of the towing vehicle to a powered element of the implement. The PTO driveline of the implement connects the PTO shaft of the towing vehicle and a component mounted to the frame of the implement, typically a gearbox assembly mounted on the implement. The PTO driveline is a telescoping assembly with universal joints and shielding that allows relative movement between the towing vehicle and the implement that is inherent with mobile operation.

Mowers are a type of implement that involve frequent sharp turns. These sharp turns require significant angular deviations between the towing vehicle and the implement which can cause similar angular deviations of the PTO driveline. Angular deviations in a PTO driveline can cause various difficulties. A hitch/driveline arrangement commonly referred to as a "swivel gearbox" hitch system has been developed for mowers and mower conditioners.

Such systems include a swivel gearbox assembly that has a vertical shaft, an upper portion that is fixed to the implement's main frame and a lower portion that can pivot about the vertical shaft and that is fixed to a towing frame. The towing frame is configured to be substantially fixed to the drawbar of the towing vehicle when the implement is attached to the towing vehicle. With this arrangement the angular deviation between the towing vehicle and the implement occurs at the axis of the vertical shaft, which is different than other hitch arrangements wherein the angular deviation occurs about the hitch pin. This swivel gearbox hitch system allows the PTO driveline to remain approximately straight, as the angular deviation between the towing vehicle and the implement occurs at the axis of the vertical shaft of the swivel gearbox. This allows the angular deviation between the components of the driveline to occur as the lower gearbox pivots about the axis of the vertical shaft.

A variety of different mechanisms have been developed to utilize this swivel gearbox hitch arrangement, many with relatively complicated mechanisms, or that require relatively complicated assemblies for attaching the towing frame to the towing vehicle drawbar, some having portions that are bolted to the drawbar.

A continuing need exists for drawbar hitch receivers having a towing frame that make hitching simple, that utilize a minimum number of components and that are pivotable relative to the pulling vehicle and the implement to minimize stress between the pulling vehicle and the implement during travel over uneven surfaces, and that adapt to wide variations in the geometry of the drawbar.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a drawbar hitch mount assembly. The assembly includes a drawbar receiver having a housing that defines a receiver chamber having a drawbar receiving axis. The receiver includes a front opening formed in the housing for removably receiving a drawbar into the chamber. A first pivot element extends from the housing. A second pivot element extends from the housing in a direction opposite the first pivot element. The assembly has a drawbar receiver pivot axis that extends through the first pivot element and the second pivot element. The pivot axis is orthogonal to the drawbar receiving axis and intersects the drawbar receiver housing.

Another aspect of the present disclosure is directed to a movable implement attachable to a towing vehicle. The implement includes a drawbar hitch mount assembly. The assembly includes a drawbar receiver having a housing that defines a receiver chamber having a drawbar receiving axis. The receiver includes a front opening formed in the housing for removably receiving a drawbar into the chamber. A first pivot element extends from the housing. A second pivot element extends from the housing in a direction opposite the first pivot element. The assembly has a drawbar receiver pivot axis that extends through the first pivot element and the second pivot element. The pivot axis is orthogonal to the drawbar receiving axis. The implement includes a tow frame having a first arm and a second arm. The first arm is pivotally attached to the first pivot element and the second arm is pivotally attached to the second pivot element such that the drawbar receiver is disposed between the first arm and the second arm.

A further aspect of the present disclosure is directed to a movable implement attachable to a towing vehicle having a drawbar. The implement includes a drawbar hitch mount assembly comprising a drawbar receiver having a housing that defines a receiver chamber having a drawbar receiving axis. The receiver includes an automatic mechanism for automatically dropping a hitch pin into a drawbar upon engaging the drawbar with the receiver. A tow frame is pivotally attached to the drawbar hitch mount assembly. The implement includes a swivel gear box having a lower portion and an upper portion. The lower portion of the swivel gearbox is connected to the tow frame and is pivotally connected to the upper portion of the swivel gear box.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
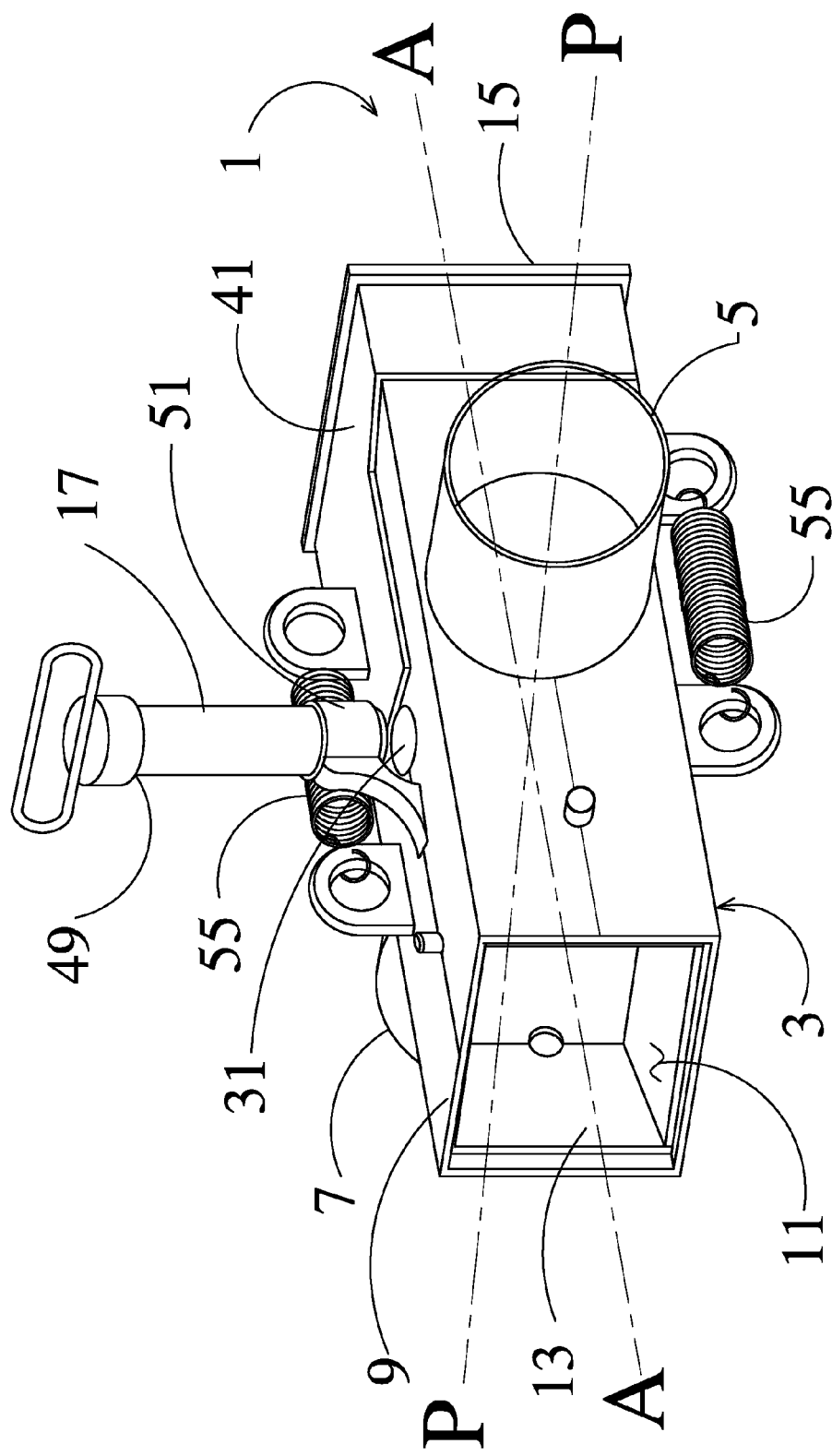
FIG. 1 is a perspective view of a drawbar hitch mount assembly and a hitch pin prior to deployment of the hitch pin.

An embodiment of a drawbar hitch mount assembly is generally referred to as "1" in FIG. 1. The drawbar hitch mount assembly 1 includes a drawbar receiver 3 and a hitch pin 17. The hitch pin 17 is not a fixed part of the assembly (it is a loose part) and is shown to illustrate an embodiment of operation of the assembly. The drawbar receiver 3 includes a housing 9 with a top portion having an aperture 31 (which may be referred to herein as a "top wall aperture"), and a first pivot element 5 and a second pivot element 7 opposite the first pivot element extending from the sides. The housing 9 further defines a chamber 11. The chamber 11 has a drawbar receiving axis A that extends through a front opening 13 formed in the housing 9 and an end cap 15. The drawbar receiving axis A is generally at the center of the housing 9 (e.g., equidistant from opposite walls of the housing). The front opening 13 is sized and shaped for receiving a drawbar (FIGS. 7-9) into the chamber 11.

The first pivot element 5 and the second pivot element 7 extend outward from the sides of the housing 9 in opposite directions without extending over any portion of the top of the housing. The drawbar hitch mount assembly 1 includes a pivot element pivot axis P that extends through the center of the first pivot element 5 and the second pivot element 7 (rotation being shown by the directional arrow). The pivot axis P is orthogonal to the drawbar receiving axis A. The pivot axis P is generally horizontal and intersects the chamber 11 of housing 9. As shown in FIGS. 1-6, the pivot axis P intersects the drawbar receiving axis A.

As shown in FIGS. 1-6, the first pivot element 5 and the second pivot element 7 are cylindrical projections that extend from the housing 9. The projections 5, 7 may be suitably attached to the housing 9 such as by welding, or may be formed as an integral part of the housing, such as a casting.

Figure 2:
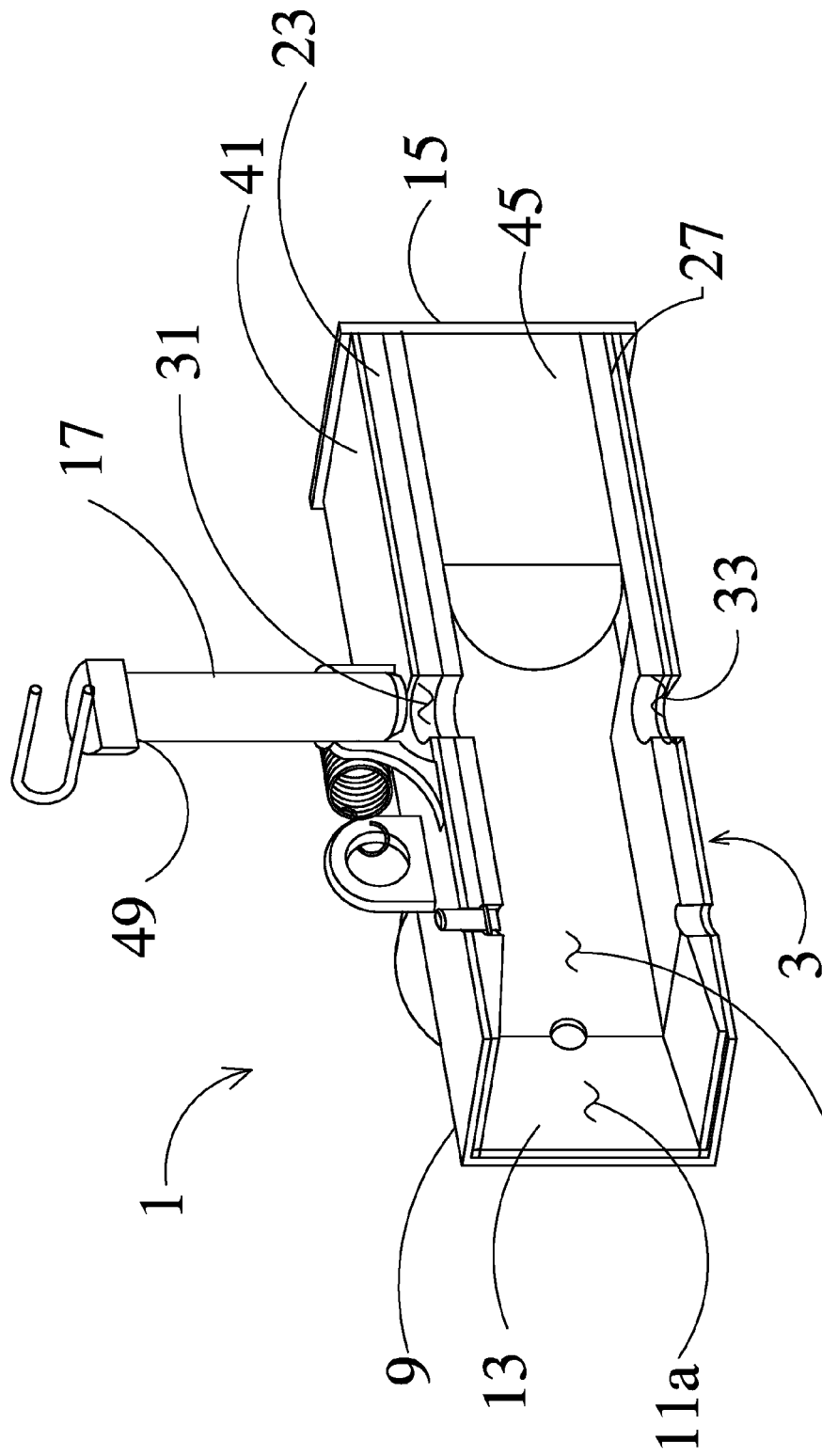
FIG. 2 is a cross-section perspective view of the drawbar hitch mount assembly and the hitch pin.
Figure 3:
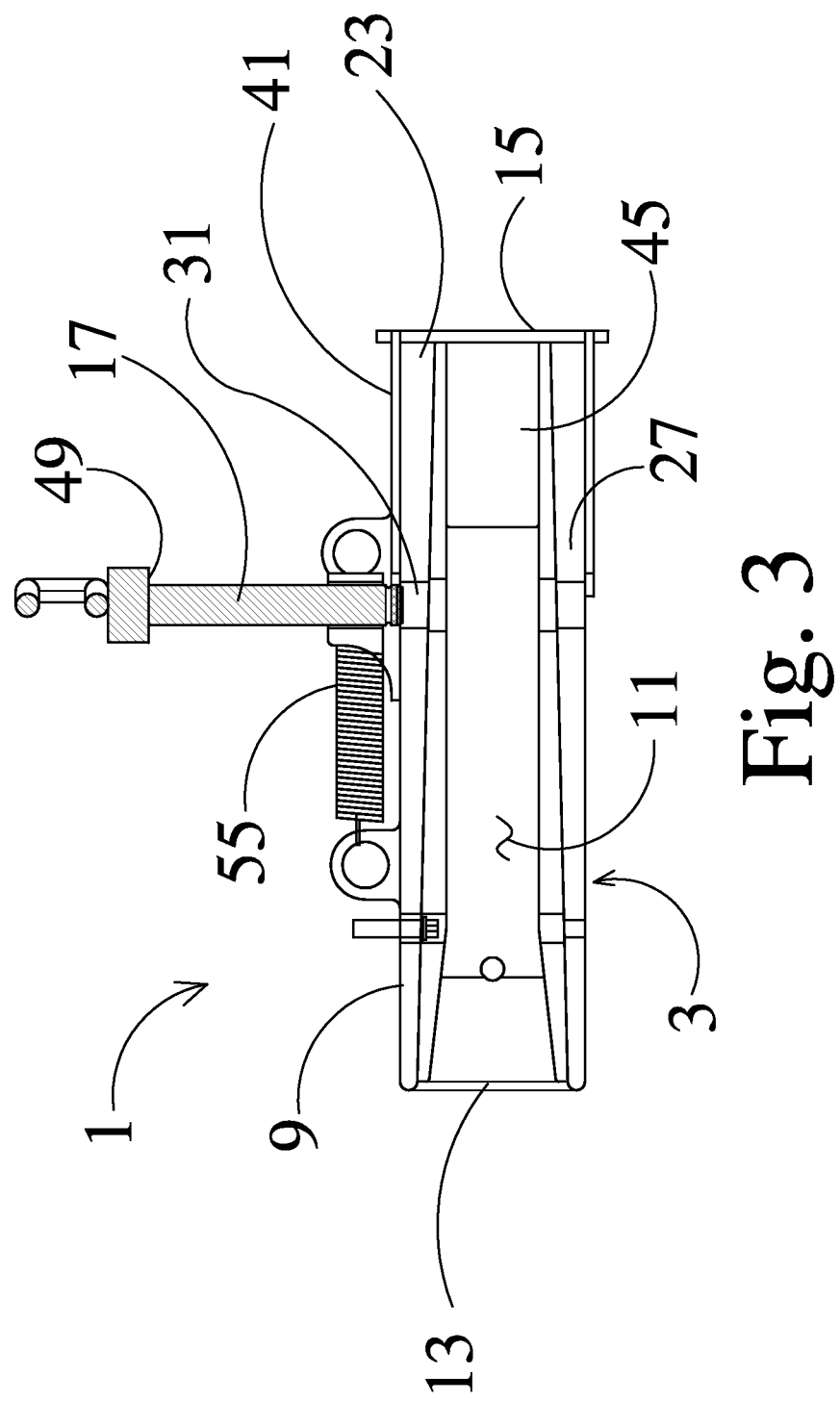
FIG. 3 is a cross-section side view of the drawbar hitch mount assembly and the hitch pin.
Figure 6:
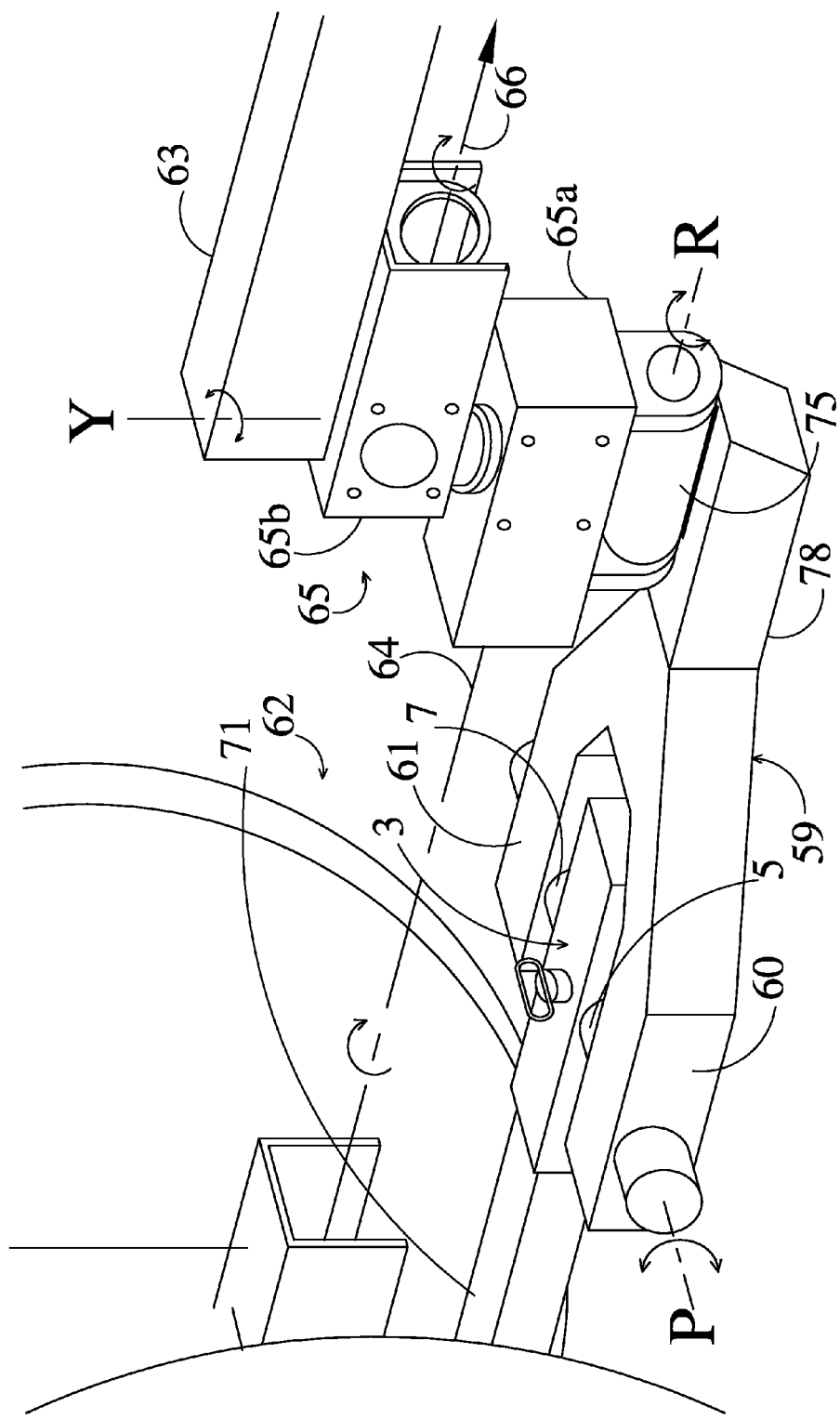
FIG. 6 is a perspective view of the drawbar hitch mount assembly, a tow frame and a towing vehicle.

Referring now to FIG. 2, the housing 9 includes a receiver top wall 23 and a receiver bottom wall 27. The receiver top wall 23 includes aperture 31 formed therein for receiving a hitch pin 17. The receiver bottom wall 27 includes aperture 33 (which may be referred to herein as "bottom wall aperture"), co-axial with the top wall aperture 31, for receiving the hitch pin 17 after engagement of the pin with a drawbar as shown in FIG. 6.

The receiver chamber 11 includes a drawbar receiving portion 11a and drawbar engagement portion 11b. The receiving portion 11a is generally larger than typical drawbars of towing vehicles to assist the operator in engaging the drawbar of the towing vehicle with the drawbar receiver 3.

As shown in FIG. 2, the receiving portion 11a of the chamber is larger in the vertical and horizontal direction relative to the drawbar engaging portion 11b of the chamber. If the drawbar contacts the interior sloped top wall or sloped bottom wall that define the receiving chamber 11a while reversing the towing vehicle, the receiver is able correct itself (i.e., move vertically) due to the vertical pivot action of the receiver (i.e., the pivot action resulting from the pivot elements 5, 7 (FIG. 1)). If the drawbar contacts one of the sloped side walls that define the receiving chamber 11a, the receiver is able correct itself (i.e., move laterally) due to the pivot action resulting from the gear box as described below. In this manner, the receiver 3 is capable of being pivoted such that the receiver top wall 23 and receiver bottom wall 27 are made parallel with the drawbar (i.e., the drawbar receiving axis A (FIG. 1) is made parallel with the drawbar) during engagement of the drawbar with the receiver.

The drawbar hitch mount assembly 1 may include an automatic mechanism for automatically dropping a hitch pin 17 into the drawbar upon engaging the drawbar with the receiver 3 (i.e., include an auto-hookup). As shown in FIG. 1, the assembly 1 includes a release plate 41 that is movably positioned atop the receiver top wall 23 relative to the top wall aperture 31 (FIG. 2). The release plate 41 is connected to an end cap 15 of the receiver 3.

Figure 4:
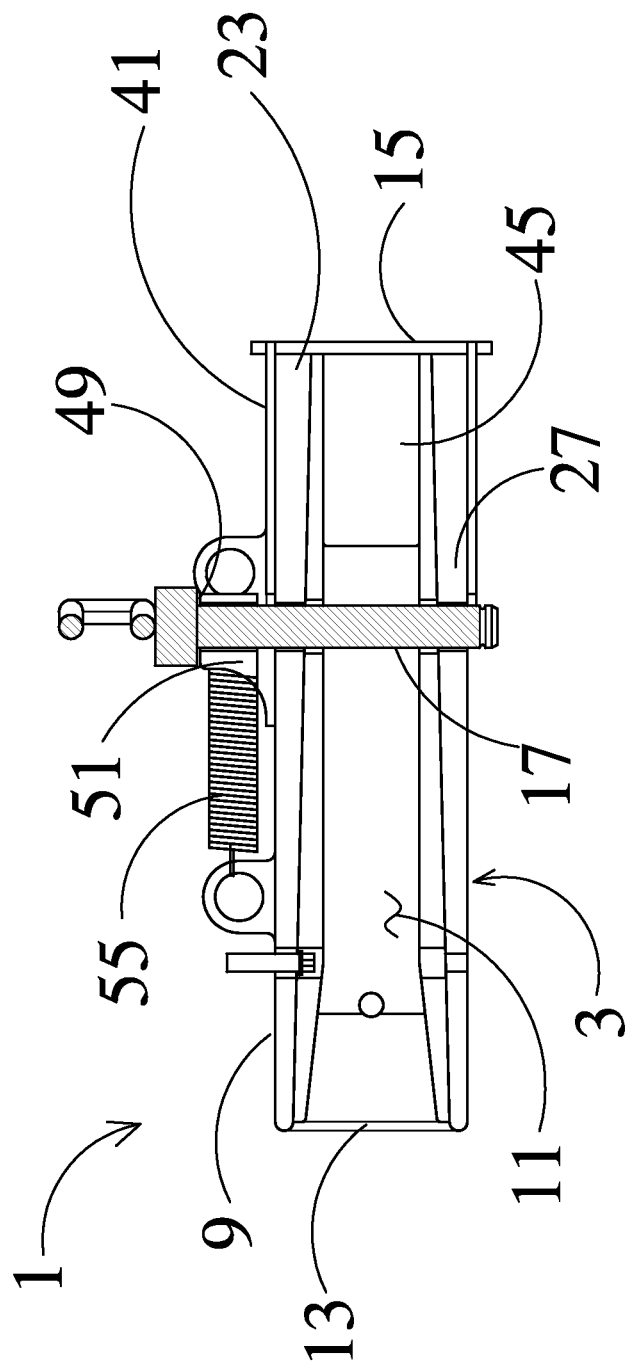
FIG. 4 is a cross-section side view of the drawbar hitch mount assembly and the hitch pin after deployment of the hitch pin.

To attach the drawbar (shown in FIG. 6) to the receiver 3, the drawbar is inserted into the chamber 11. During insertion, the drawbar begins to engage a push bar 45 that is connected to the end cap 15 and that is movable within the receiver chamber 11. The push bar 45 moves along the drawbar receiving axis A (FIG. 1) in a direction away from the front opening 13 of the receiver 3, causing the end cap 15 and release plate 41 to move in a direction away from the front opening 13 of the receiver. The release plate 41 continues to move at least until it uncovers the top wall aperture 31. Uncovering the top wall aperture 31 allows the hitch pin 17 to fall within the aperture 31. As the drawbar continues into the chamber, the hitch pin 17 aligns with an opening in the drawbar (shown in FIG. 6) and falls within the drawbar opening. After entering the drawbar opening, a portion of the hitch pin 17 also falls through the bottom wall aperture 33. The hitch pin 17 falls until a stop portion 49 of the pin contacts the hitch pin holder 51 (FIG. 4).

To disengage the drawbar from the receiver 3, the hitch pin 17 is removed from the drawbar and the drawbar is pulled from the receiver 3. Torsion elements such as springs 55 return the release plate 41, end cap 15, and push bar 45 to their initial position.

While the drawbar receiver 3 is shown and described herein in combination with a mechanism for automatically deploying the hitch pin 17 upon engaging the drawbar with the receiver, in other embodiments the drawbar hitch mount assembly 1 may not include an automatic deployment mechanism. In such embodiments, the hitch pin 17 may be manually inserted by personnel such as the towing vehicle operator.

Figure 5:
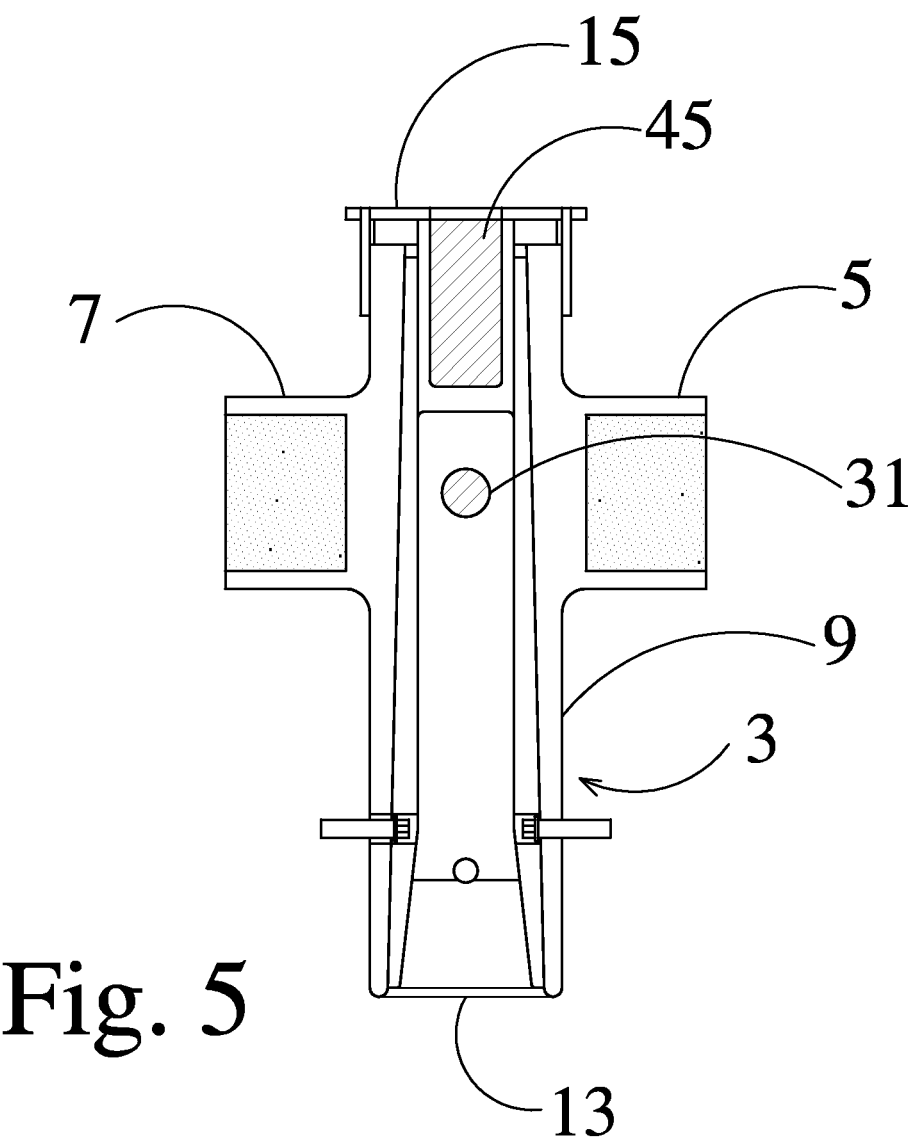
FIG. 5 is a cross-section top view of the drawbar hitch mount assembly.

Referring now to FIG. 5, the first pivot element 5 and second pivot element 7 connect to the housing 9 or extend from the sides of the housing 9 so that the top of the housing 9 is unobstructed.

The drawbar receiver 3 is pivotally attached to a tow frame 59 (FIG. 6). The tow frame 59 is generally Y-shaped and includes a first arm 60 and a second arm 61 to which the first pivot element 5 and the second pivot element 7 are respectively pivotally attached. Such an arrangement allows the receiver 3 to be pivotally disposed between the arms 60, 61. The receiver 3 is balanced with respect to the pivot axis P to allow for mating of the receiver 3 to the drawbar (i.e., the receiver 3 is balanced such that the drawbar receiving axis A is parallel to the drawbar during engagement). The first pivot element 5 and second pivot element 7 may be pivotally connected to the arms 60, 61 by any suitable method such as by use of bushings or bearings which allow for pivot of the drawbar receiver 3 relative to the tow frame 59. In addition to the first arm 60 and the second arm 61, the tow frame 59 further includes a base leg 78 to which a sleeve 75 is mounted.

The drawbar receiver 3 may be balanced across its pivot axis such that the receiver will remain substantially horizontal and parallel to the drawbar 71 of the towing vehicle 62 (FIG. 6) during attachment of the drawbar hitch mount assembly 1 to the drawbar to facilitate ease of attachment of the drawbar to the receiver. Alternatively or in addition, the drawbar receiver 3 may be maintained at a position parallel to the ground by use of torsion elements such as springs (not shown). Generally, the drawbar receiver 3 may be somewhat misaligned (vertically or horizontally) as the beveled interior edges at the opening 13 allow the receiver 3 to move parallel with the drawbar 71 (FIG. 6) during attachment to the drawbar.

As shown in FIG. 6, power from the PTO shaft of the towing vehicle is transferred through the driveline of the implement along a PTO driveline (not shown) that extends along axis 64, gearbox 65, and implement drive shaft that extends along axis 66. The tow frame 59 is connected to the housing of the lower portion 65a of the swivel gear box 65 and the PTO driveline is attached to the input shaft of the lower portion 65a of the gearbox 65. The lower portion 65a of the gear box 65 is attached to the upper portion 65b of the gear box by a vertical drive shaft. The housing of the upper portion 65b of the swivel gear box 65 is attached to the tongue 63 of the implement while the output shaft of the upper portion 65b of the gearbox 65 is attached to the implement driveshaft.

As illustrated in FIG. 6, drawbar receiver 3 is free to pivot about pivot axis P (rotation being shown by the directional arrow) relative to the tow frame 59, allowing the implement to pivot relative to the towing vehicle when traversing terrain that has vertical deviations along the path of travel.

A second pivot axis R (rotation being shown by the directional arrow) is provided in the pivotal connection between the tow frame 59 and the housing of the bottom portion 65a of the gearbox 65. The tow frame 59 is attached to a sleeve 75. The lower portion 65a of the swivel gear box 65 includes a connector (not shown) that passes through the sleeve 75 and that pivots within the sleeve. This defines a pivot axis R that is offset 90° from the pivot axis P of the drawbar receiver 3 and that is generally directionally aligned with the drawbar receiver axis A (FIG. 1). This pivot allows the implement to pivot relative to the towing vehicle when traversing terrain with vertical deviations lateral to the path of travel, for instance in situations where the mower may be higher or lower than the towing vehicle when shifted to the left or right of the towing vehicle.

The lower portion 65a of the swivel gear box 65, along with the tow frame 59, pivots about an axis Y (rotation being shown by the directional arrow) relative to the upper portion 65b of the swivel gear box. The pivot axis Y is perpendicular to pivot axis R and is generally vertical. This pivot arrangement allows the tow frame 59 to pivot relative to the tongue 63 of the implement (FIG. 6). The pivot between the lower portion 65a and upper portion 65b of the swivel gear box 65 allows the towing vehicle 62 to freely turn during travel. In addition, this pivot allows the drawbar receiver 3 to be adjusted laterally when attaching the drawbar to the receiver 3. Considered in terms of Cartesian coordinates, the pivot axes P, R and Y together generally facilitate the pivoting/swiveling of the drawbar hitch mount assembly 1 in any or all of the X, Y, and Z directions.

The drawbar hitch mount assembly 1 may be used to pull a variety of towable or movable implements including any towed implement that generally operates through relatively sharp turns with relatively high PTO loads and/or implements that are operated over surfaces with relatively sharp changes in elevation (e.g., hills, slopes). Exemplary implements include agricultural implements such as mower conditioners and peanut harvesters.

Compared to conventional hitch receiver assemblies, the assembly 1 described above has several advantages. The assembly 1 includes a receiver 3 that is fixed to the implement and that may pivot in a vertical and horizontal direction to facilitate attachment of a towing vehicle drawbar to the receiver. In addition, by positioning the pivot elements 5, 7 such that they extend laterally outward from the side of the housing 9, the receiver 3 of the assembly 1 may be better balanced in the receiver tow frame 59 allowing the length and weight of the housing to be reduced. By reducing the length of the housing, the distance between the receiver top wall aperture 31 and the front opening 13 of the receiver 3 may be reduced. This reduction in length allows the receiver 3 to mate with a variety of towing vehicle drawbars including the drawbars 73 shown in FIGS. 7-9.

Figure 7:
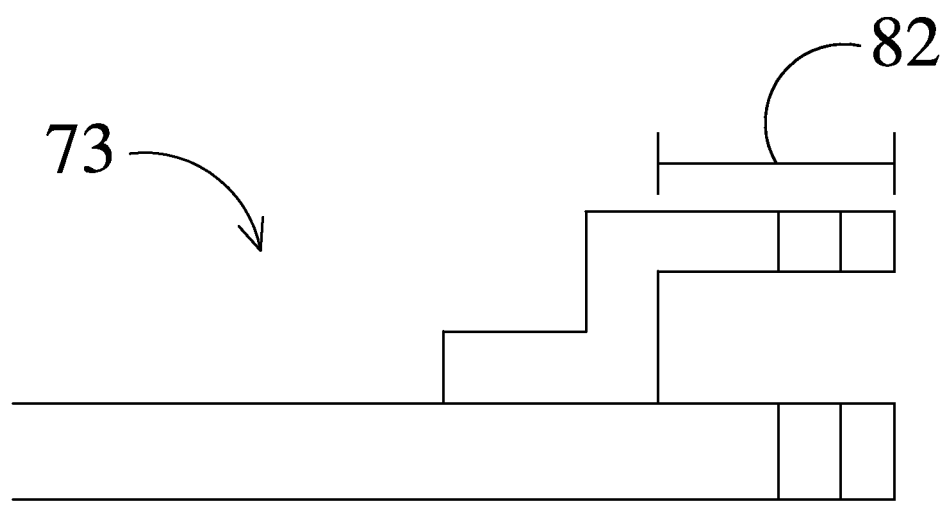
FIG. 7 is a cross-section side view of a drawbar having a clevis.
Figure 8:
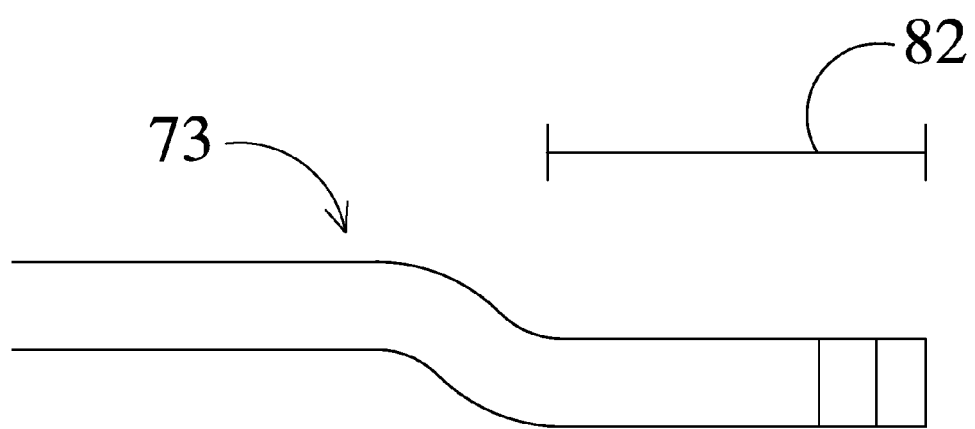
FIG. 8 is a cross-section side view of a drop-drawbar.
Figure 9:
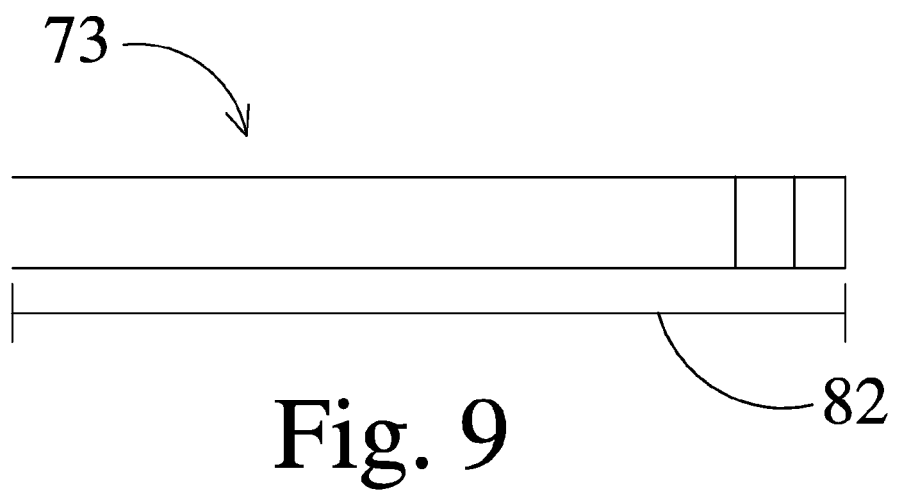
FIG. 9 is a cross-section side view of a straight drawbar.

As a result of the advantages noted above, in some embodiments of the present disclosure the hitch receiver assembly 1 (i.e., drawbar receiver 3) is capable of mating with a variety of drawbar sizes and shapes. In addition to straight drawbars 73 (FIG. 9), the hitch receiver assembly 1 may be capable of mating with a drawbar 73 with a clevis such as shown in FIG. 7 of the present application and in FIG. 2 of ANSI/ASABE Standard AD6489-3:2004—*Agricultural Vehicles—Mechanical Connections between Towed and Towing Vehicles—Part 3: Tractor Drawbar,* which is incorporated herein by reference for all relevant and consistent purposes. The hitch receiver assembly 1 may also be capable of mating with a drop-drawbar 73 (FIG. 8). Each drawbar type includes a receiver engagement section 82 (section forward of the clevis for clevis-drawbars and forward of the drop for drop-drawbars). The hitch receiver assembly 1 is capable of mating to a drawbar with a receiver engagement section 82 having a length as small as 4 inches. In some embodiments, the length of the drawbar receiver housing 9 is less than about 10 inches, less than about 8 inches or less than about 6 inches (e.g., from about 6 to 10 inches or from about 8 to 10 inches).

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A drawbar hitch mount assembly comprising:
   a drawbar receiver comprising:
      a housing having a receiver top wall, a receiver bottom wall and two sides;
      a receiver chamber within the receiver top wall, receiver bottom wall and the two sides, the receiver chamber having a drawbar receiving axis; and
      a front opening formed in the housing for removably receiving a drawbar into the chamber;
   a first pivot element that extends from the housing;
   a second pivot element that extends from the housing in a direction opposite the first pivot element, the assembly having a drawbar receiver pivot axis that extends through the first pivot element and the second pivot element, the pivot axis being orthogonal to the drawbar receiving axis and intersecting the drawbar receiver chamber.

2. The drawbar hitch mount assembly as set forth in claim 1 wherein the drawbar receiver pivot axis intersects the drawbar receiving axis.

3. The drawbar hitch mount assembly as set forth in claim 1 wherein the first pivot element includes a first cylindrical projection that extends from the housing and the second pivot element includes a second cylindrical projection that extends from the housing.

4. The drawbar hitch mount assembly as set forth in claim 1 wherein the drawbar receiver comprises a receiver top wall having a top wall hitch pin aperture formed therein.

5. The drawbar hitch mount assembly as set forth in claim 4 further comprising a release plate that is movably positioned atop the receiver top wall relative to the top wall hitch pin aperture.

6. The drawbar hitch mount assembly as set forth in claim 5 further comprising:
   an end cap attached to the release plate opposite the front opening of the receiver; and
   a push bar movable in the receiver chamber and connected to the end cap.

7. The drawbar hitch mount assembly as set forth in claim 1 wherein the drawbar receiver contains interior beveled edges at the front opening thereof.

8. The drawbar hitch mount assembly as set forth in claim 1 wherein the length of the drawbar receiver housing is less than about 10 inches.

9. The drawbar hitch mount assembly as set forth in claim 1 wherein the length of the drawbar receiver housing is less than about 6 inches.

10. A movable implement attachable to a towing vehicle, the implement comprising:
    a drawbar hitch mount assembly comprising:
       a drawbar receiver having a housing that defines a receiver chamber having a drawbar receiving axis, the receiver including a front opening formed in the housing for removably receiving a drawbar into the chamber;
       a first pivot element that extends from the housing; and
       a second pivot element that extends from the housing in a direction opposite the first pivot element, the second pivot element being distinct from the first pivot element, the assembly having a drawbar receiver pivot axis that extends through the first pivot element and the second pivot element, the pivot axis being orthogonal to the drawbar receiving axis; and
    a tow frame having a first arm and a second arm, the first arm being pivotally attached to the first pivot element at the pivot axis and the second arm being pivotally attached to the second pivot element at the pivot axis such that the drawbar receiver is disposed between the first arm and the second arm.

11. The implement as set forth in claim 10 wherein the drawbar receiver pivot axis intersects the drawbar receiver chamber.

12. The implement as set forth in claim 10 wherein the drawbar receiver pivot axis intersects the drawbar receiving axis.

13. The implement as set forth in claim 10 further comprising a tongue pivotally connected to the tow frame.

14. The implement as set forth in claim 13 wherein the tongue and tow frame are attached to a swivel gearbox to facilitate pivoting of the tongue relative to the tow frame.

15. The implement as set forth in claim 14 wherein the swivel gear box has a lower portion and an upper portion, the tow frame being pivotally connected to the lower portion of the swivel gear box and the lower portion of the swivel gear box being pivotally connected to the upper portion of the swivel gear box.

16. The implement as set forth in claim 10 wherein the first pivot element includes a first cylindrical projection that extends from the housing and the second pivot element includes a second cylindrical projection that extends from the housing.

17. The implement as set forth in claim 10 wherein the drawbar receiver comprises a receiver top wall having a top wall hitch pin aperture formed therein.

18. The implement as set forth in claim 17 wherein the drawbar hitch mount assembly further comprises a release plate that is movably positioned atop the receiver top wall relative to the top wall hitch pin aperture.

19. The implement as set forth in claim 18 wherein the drawbar hitch mount assembly further comprises:
    an end cap attached to the release plate opposite a front opening of the receiver; and
    a push bar movable in the receiver chamber and connected to the end cap.

20. The implement as set forth in claim 10 wherein the drawbar receiver contains beveled interior edges at the front opening.

21. The implement as set forth in claim 10 wherein the length of the drawbar receiver housing is less than about 10 inches.

22. The implement as set forth in claim 10 wherein the length of the drawbar receiver housing is less than about 6 inches.

23. A movable implement attachable to a towing vehicle having a drawbar, the implement comprising:
    a drawbar hitch mount assembly comprising:
       a drawbar receiver having a housing that defines a receiver chamber having a drawbar receiving axis, a front opening formed in the housing for removably receiving a drawbar into the chamber and a receiver top wall having a top wall hitch pin aperture formed therein; and an automatic mechanism for automatically dropping a hitch pin into a drawbar upon engaging the drawbar with the receiver, the mechanism comprising a release plate that is movably positioned atop the receiver top wall relative to the top wall hitch pin aperture;

a tow frame pivotally attached to the drawbar hitch mount assembly; and a swivel gear box having a lower portion and an upper portion, the lower portion of the swivel gear box being connected to the tow frame and being pivotally connected to the upper portion of the swivel gear box.

24. The implement as set forth in claim 23 wherein the tow frame is pivotally connected to the lower portion of the swivel gear box.

25. The implement as set forth in claim 23 wherein the drawbar hitch mount assembly further comprises:

an end cap attached to the release plate opposite the front opening of the receiver;

a push bar movable in the receiver chamber and connected to the end cap; and a hitch pin holder for holding a hitch pin above the release plate.

\* \* \* \* \*